United States Patent
Bade et al.

(10) Patent No.: US 11,628,845 B2
(45) Date of Patent: Apr. 18, 2023

(54) METHOD AND DEVICE FOR DRIVER STATE EVALUATION AND VEHICLE

(71) Applicant: Bayerische Motoren Werke Aktiengesellschaft, Munich (DE)

(72) Inventors: Florian Bade, Munich (DE); Martin Buchner, Munich (DE); Julia Niemann, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 141 days.

(21) Appl. No.: 16/734,520

(22) Filed: Jan. 6, 2020

(65) Prior Publication Data

US 2020/0189602 A1 Jun. 18, 2020

Related U.S. Application Data

(63) Continuation of application No. PCT/EP2018/069594, filed on Jul. 19, 2018.

(30) Foreign Application Priority Data

Aug. 7, 2017 (DE) ..................... 10 2017 213 679.0

(51) Int. Cl.
*B60W 40/08* (2012.01)
*B60W 30/18* (2012.01)

(52) U.S. Cl.
CPC ............ *B60W 40/08* (2013.01); *B60W 30/18* (2013.01); *B60W 2040/0818* (2013.01); *B60W 2520/10* (2013.01); *B60W 2540/26* (2013.01)

(58) Field of Classification Search
CPC ................. B60W 2040/0818; B60W 2540/26
See application file for complete search history.

(56) References Cited

U.S. PATENT DOCUMENTS

| 2010/0156617 A1 | 6/2010 | Nakada et al. |
| 2013/0169785 A1* | 7/2013 | Matthews .............. B60Q 9/008 348/77 |

(Continued)

FOREIGN PATENT DOCUMENTS

| DE | 10 2009 002 979 A1 | 11/2010 |
| DE | 10 2013 203 925 A1 | 9/2014 |

(Continued)

OTHER PUBLICATIONS

International Search Report (PCT/ISA/210) issued in PCT Application No. PCT/EP2018/069594 dated Nov. 6, 2018 with English translation (six (6) pages).

(Continued)

*Primary Examiner* — Imran K Mustafa
(74) *Attorney, Agent, or Firm* — Crowell & Moring LLP

(57) ABSTRACT

A method and a device for driver state evaluation are provided. In a detection step, in a sensor-aided manner, a driver's viewing direction in a field of view defined relative to the vehicle is detected and a solid angle oriented to the viewing direction is determined depending on at least one parameter that influences the field of view. In an evaluation step, at least one object point of the three-dimensional surroundings of the driver is evaluated on the basis of the latter's position with respect to the solid angle determined and an attentiveness-related driver state is ascertained depending on this evaluation and is output.

19 Claims, 2 Drawing Sheets

(56) References Cited

U.S. PATENT DOCUMENTS

| | | | | |
|---|---|---|---|---|
| 2014/0225725 A1* | 8/2014 | Takahashi | .............. | B60K 28/02 |
| | | | | 340/439 |
| 2017/0169302 A1* | 6/2017 | Omi | .......................... | G06T 7/73 |
| 2017/0187963 A1* | 6/2017 | Lee | .................... | H04N 5/23218 |
| 2018/0090002 A1* | 3/2018 | Arita | .................. | G02B 27/0101 |
| 2018/0173230 A1* | 6/2018 | Goldman-Shenhar | ....................... | |
| | | | | B60W 50/08 |

FOREIGN PATENT DOCUMENTS

| | | |
|---|---|---|
| DE | 10 2013 221 526 A1 | 4/2015 |
| DE | 10 2014 009 638 A1 | 12/2015 |
| DE | 10 2015 207 474 A1 | 10/2016 |
| DE | 10 2015 117 610 A1 | 4/2017 |
| JP | 2014-120111 A | 6/2014 |
| JP | 2015-106395 A | 6/2015 |
| WO | WO 2017/063892 A1 | 4/2017 |

OTHER PUBLICATIONS

German-language Written Opinion (PCT/ISA/237) issued in PCT Application No. PCT/EP2018/069594 dated Nov. 6, 2018 (six (6) pages).

German-language Search Report issued in counterpart German Application No. 10 2017 213 679.0 dated Jul. 17, 2018 with partial English translation (13 pages).

* cited by examiner

METHOD AND DEVICE FOR DRIVER STATE EVALUATION AND VEHICLE

CROSS REFERENCE TO RELATED APPLICATIONS

This application is a continuation of PCT International Application No. PCT/EP2018/069594, filed Jul. 19, 2018, which claims priority under 35 U.S.C. § 119 from German Patent Application No. 10 2017 213 679.0, filed Aug. 7, 2017, the entire disclosures of which are herein expressly incorporated by reference.

BACKGROUND AND SUMMARY OF THE INVENTION

The invention relates to a method and an apparatus for driver state evaluation with respect to a driver of a vehicle, in particular of a motor vehicle, and to a motor vehicle having such an apparatus.

For controlling functionalities, in particular assistance functions, of a vehicle, the knowledge of the attention of the driver of the vehicle with respect to an object relating to the functionality may be necessary in some cases. For example, provision may be made for a cross traffic assistant to prevent the changing of a lane if the driver pays no attention, or only insufficient attention, to what is known as the "blind angle." Similarly, for example, provision may be made for a traffic jam assistant to automatically initiate braking of the vehicle if the driver during driving in a traffic jam fails to pay attention to a vehicle that is located in front of him.

It is known from the prior art to monitor visual focusing of a driver so as to evaluate the attention of the driver with respect to such an object. To this end, a head pose, that is to say the tilt of the head in relation to a longitudinal, transverse, and vertical axis of the vehicle, can be captured and a viewing direction can be derived therefrom on the basis of which it is possible in turn to determine whether the object is located within the driver's field of view.

It is an object of the present invention to improve an evaluation of a driver state with respect to a driver of a vehicle, in particular to more precisely and/or more reliably evaluate the attention of the driver with respect to a point or object.

A first aspect of the invention relates to a method for driver state evaluation with respect to a driver of a vehicle, in particular of a motor vehicle, wherein the method includes the following steps: (i) a capturing step in which a viewing direction of the driver into a field of view that is defined relative to the vehicle is captured with sensor support and a solid angle aligned with the viewing direction is ascertained in dependence on at least one parameter that influences the field of view; and (ii) an evaluation step in which at least one object point of the three-dimensional environment of the driver is evaluated on the basis of his position with respect to the ascertained solid angle and an attention-related driver state is determined in dependence on said evaluation and is output.

A field of view of a driver within the meaning of the invention is understood to mean a region from the three-dimensional surroundings of the driver in which objects are visually perceivable by the driver with a given head position. In particular, the region can be limited, for example shaded, by further objects. Within this meaning, the field of view is physically measurable or at least estimable, and a parameter that influences the field of view can relate to, for example, the arrangement of said further objects, such as components of a vehicle that impair the driver's view out of the vehicle. The driver's field of view is in particular a region from the three-dimensional surroundings of the driver which the driver faces and thus to which he actively pays attention. In this context, a parameter that influences the field of view can also relate to, in particular visual, stimulations that cause a change in the head position and thus in the field of view.

An object point of a three-dimensional environment of a driver within the meaning of the invention is understood to mean a location that characterizes a position of an object, in particular relative to the driver. An object point can designate for example the position of a road user, in particular relative to the driver, or the position of an operating element in the vehicle interior, in particular relative to the driver. A plurality of object points can thus also designate a line and/or an area, for example a street region, in particular a lane, or a region of a dashboard, in particular a speedometer or a different display apparatus.

By taking into consideration at least one parameter that characterizes an influence being exerted on the field of view, it is possible to ascertain or at least estimate which region from the three-dimensional surroundings of the driver within the ascertained solid angle is at all visually perceived, or at any rate is visually perceived particularly clearly and/or reliably, by the driver. Ascertaining the solid angle in dependence on the viewing direction of the driver here permits a spatially highly resolved differentiation of object points located within or outside of the solid angle and therefore a reliable evaluation of the driver attention with respect to at least one object point.

In particular, dynamic monitoring of the driver attention with respect to the at least one object point is made possible here. If the driver moves, in particular if his head, and consequently also his viewing direction, moves, the solid angle also correspondingly realigns as per the method according to the invention. Further object points may thereby enter or leave the ascertained solid angle even in the case of only minor corrections to the position of the solid angle in the three-dimensional surroundings of the driver. In particular, the driver's attention with respect to at least one object point can thus be monitored in a substantially spatially continuous manner in the three-dimensional surroundings of the driver.

Overall, the invention permits a more reliable evaluation of the attention of a driver of a vehicle with respect to specific objects in his surroundings.

In a preferred embodiment, the solid angle is ascertained in the capturing step such that the viewing direction extends through a center, in particular the centroid, of the solid angle. The center, in particular the centroid, can here define a region in which the driver's attention is evaluated to be particularly high. It is therefore possible for the solid angle region to reliably indicate the region in which the driver focuses his attention.

The position of the at least one object point is preferably evaluated with respect to the center, in particular the centroid, of the solid angle. A position of the at least one object point in the region, in particular in the vicinity, of the center is here preferably defined as a high degree of attention of the driver with respect to the at least one object point, while a position of the at least one object point in a peripheral region of the solid angle, in particular at a great distance from the center of the solid angle, is defined as a low degree of attention of the driver. The attention of the driver with respect to object points can thus be ascertained dynamically and in a differentiated manner.

In a further preferred embodiment, the at least one parameter characterizes a seating position and/or anatomical property of the driver. The at least one parameter is preferably ascertained by way of sensor means or is provided via an interface.

To this end, the driver, in particular his head, can be captured by a sensor device, such as a camera, wherein, besides the head position, preferably also the position of the head in the vehicle, the relative eye position, that is to say the viewing direction of the eyes relative to a direction extending perpendicular to the driver's face, and/or the posture of the driver is derived from the sensor data produced in that case. Alternatively or additionally, the at least one parameter can also be input by the driver via a user interface (man machine interface, MMI).

The at least one parameter can characterize in particular the visual acuity of the driver, such as whether the driver wears a vision aid and to what extent the vision aid limits his field of view, or to what extent an anatomical eye position of the driver, that is to say the position of the eyes in the driver's head, influences the field of view.

The solid angle can be ascertained particularly reliably and precisely with each of the aforementioned embodiments, as a result of which a correspondingly exact evaluation of an object point in terms of its position in relation to the solid angle is made possible.

In a further preferred embodiment, the at least one parameter is dynamically ascertained in dependence on a vehicle state, in particular on a driving situation. It is thereby possible to take into account the fact that, in the case of specific vehicle states or in specific driving situations, the field of view of the driver is, in particular physically and/or psychologically, limited.

For example, if the vehicle is situated in a traffic jam, the field of view of the driver is substantially limited to the immediate vehicle surroundings. In other words, the vision of the driver is limited by the further vehicles surrounding the vehicle in a manner such that for example a motorcycle rider snaking through between the standing vehicles cannot be visually perceived or be perceived only to a limited extent. Similar is true for example also in the case of difficult weather conditions such as snow and/or fog. Accordingly, if a field of view is limited, it is possible for preferably the solid angle to be correspondingly limited too, with the result that it covers only a correspondingly reduced portion of the field of view.

In a further preferred embodiment, the at least one parameter characterizes the speed of the vehicle. As the speed increases, the perception of the driver typically increasingly focuses on the street portion located in front of him ("tunnel vision"), with the result that his viewing region can be increasingly limited as his speed increases. The solid angle region is therefore preferably restricted in the case of an increasing speed.

In a further preferred embodiment, the at least one parameter is defined by interior components of the vehicle. The at least one parameter here preferably characterizes the position of the driver's head relative to the position of the interior components that can impair the view of the driver, for example the rear-view mirror, A, B and/or C pillars, dashboard, steering wheel, navigation display and/or the like. The solid angle can thus be ascertained in a manner such that object points located, with respect to the driver's head, behind one of the interior components are reliably evaluated as not having been noticed by the driver.

In a further preferred embodiment, the at least one object point of the three-dimensional environment of the driver is indicated by a predetermined point on the vehicle itself. In particular, the at least one object point is a stationary, that is to say positionally fixed, object point and is provided by an operating element of a functionality of the vehicle and/or by a geometry of the vehicle interior.

The position of the at least one object point is here preferably derived from a model of the vehicle, such as a CAD model. In one embodiment, the at least one object point can be formed by at least one node of a grid model of the vehicle. The spatial density of the grid points of the grid model of the vehicle can here preferably be adapted in dependence on a specified accuracy of the driver state evaluation.

By virtue of the object point being formed as a predetermined point on the vehicle itself, it is possible to precisely and reliably capture whether the driver has paid attention to an individual object point, such as an operating element, or to an operating area formed by a plurality of object points, such as a display, of the vehicle.

In a further preferred embodiment, one or more objects outside the vehicle are captured by sensors. In particular, each of these captured objects that are outside the vehicle can define at least one object point of the three-dimensional environment of the driver. In this way, it is also possible to reliably evaluate the driver's attention with respect to the objects that are outside the vehicle.

In a further preferred embodiment, a virtual cross-sectional area through the solid angle and a lateral delimitation of said cross-sectional area are defined in dependence on the distance thereof from the driver on the basis of the solid angle that has been ascertained. The evaluation of the at least one object point on the basis of the position thereof with respect to the ascertained solid angle is preferably furthermore performed on the basis of a mathematical projection of the object point onto the virtual cross-sectional area. The virtual cross-sectional area is preferably defined here such that it is oriented substantially perpendicular to the ascertained viewing direction.

The virtual cross-sectional area through the solid angle preferably contains substantially the area A, via which the solid angle $\Theta$ is definable in accordance with the formula $\Theta = A/r^2$, wherein the distance from the driver is preferably the radius r via which the solid angle is definable in accordance with said formula. The lateral delimitation of the cross-sectional area can here be defined by the line of intersection of the ascertained solid angle with a plane that is perpendicular to the ascertained viewing direction. The virtual cross-sectional area can here, in particular in dependence on the solid angle, have a circular, elliptical, rectangular, trapezoidal, parallelogram or irregular shape.

The driver's attention with respect to the at least one object point can be reliably and precisely ascertained by way of the mathematical projection of the at least one object point onto the virtual cross-sectional area.

In a further preferred embodiment, the at least one object point is evaluated as not having been noticed by the driver if the at least one object point, when projected onto the virtual cross-sectional area, does not lie within the lateral delimitation of the virtual cross-sectional area. This makes a simple and fast evaluation of object points with respect to the attention of the driver possible.

In a further preferred embodiment, the at least one object point is evaluated as having been noticed by the driver if the at least one object point, when projected onto the virtual cross-sectional area, lies within the lateral delimitation of the virtual cross-sectional area. Based on the lateral delimitation of the cross-sectional area, object points can thus be divided into object points that the driver cannot notice owing to external conditions and object points that can be noticed by the driver, at least potentially.

In a further preferred embodiment, the evaluation of the at least one object point characterizes a probability with which the driver notices the at least one object point. The probability can be used as a measure of the noticing of the object point by the driver. In other words, the noticing of the object point by the driver can be evaluated using the probability. This probability is here preferably ascertained on the basis of the distance of the projection of the object point onto the virtual cross-sectional area from a center, in particular a center point, such as a centroid, of the solid angle and is in particular inversely proportional to said distance, that is to say the smaller the distance of the projection from the center of the solid angle is, the greater is the ascertained probability that the driver perceives the object point. The driver's field of view can hereby be divided into a central viewing region around the viewing direction on which the driver is visually focused and a peripheral viewing region at the periphery of the solid angle. The evaluation of at least one object point with respect to the driver's attention can thus be effected dynamically and in a differentiated fashion.

In a further preferred embodiment, a functionality of the vehicle is controlled based on the attention-related driver state that is output. Preferably, one or more driver assistance systems are controlled based on the attention-related driver state that is output, which systems can accordingly react differently in a specified driving situation depending on the respective driver state. The functionality of the vehicle can thus be controlled in a differentiated fashion.

A second aspect of the invention relates to an apparatus for ascertaining an attention-related driver state of a driver of a vehicle, in particular of a motor vehicle, which is designed to perform the method as per the first aspect of the invention.

A third aspect of the invention relates to a vehicle, in particular to a motor vehicle, having an apparatus according to the second aspect of the invention.

The features and advantages that have been described with respect to the first aspect of the invention and the advantageous configuration thereof also apply, where technically reasonable, to the stated further aspects of the invention and the respective advantageous configuration thereof, and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
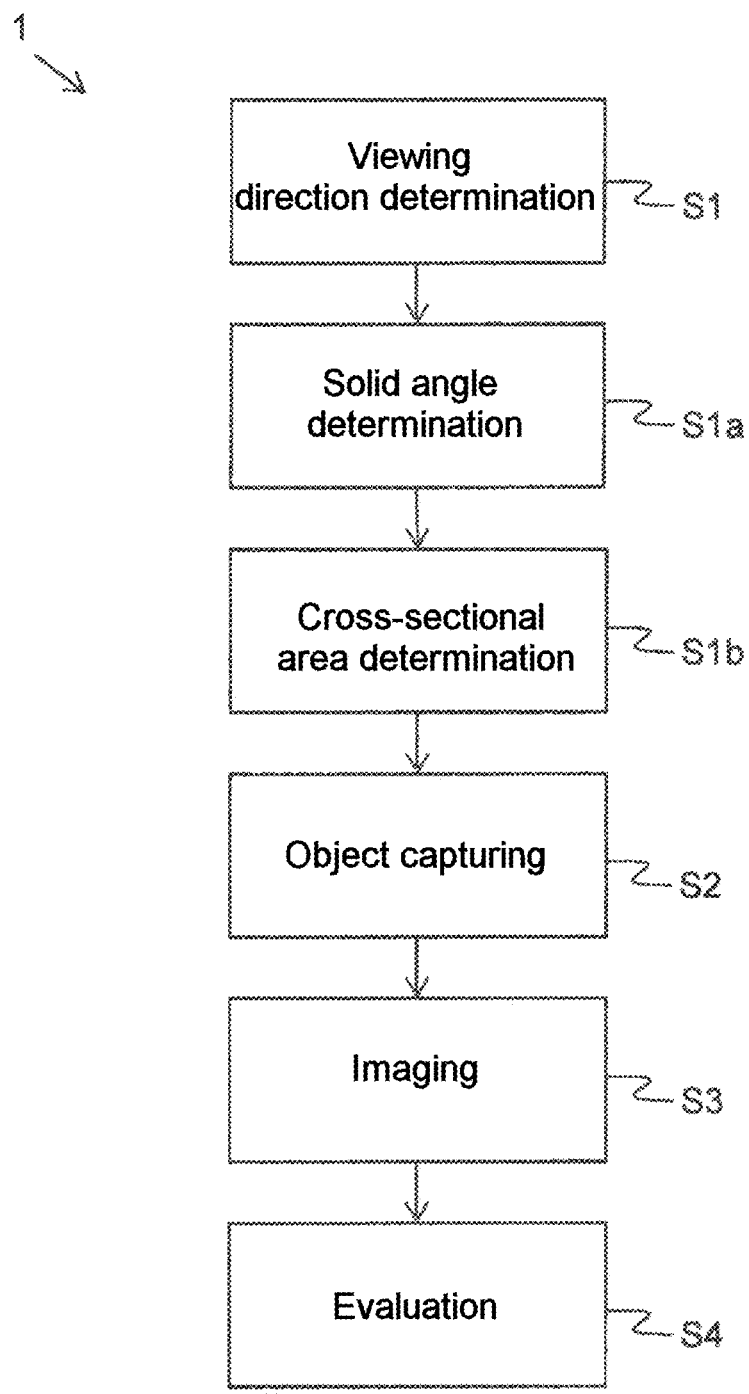
FIG. 1 is a flow chart of an exemplary embodiment of a method for driver state evaluation.

FIG. 1 shows an exemplary embodiment of a method 1 for driver state evaluation with respect to a driver of a vehicle, in particular of a motor vehicle.

In a capturing step S1, parameters based on which the driver state evaluation is performed are captured. Using a sensor apparatus, for example a camera installed in the steering wheel of the vehicle, the head pose, seating position, anatomy and/or the like of the driver can be captured. Initially, a viewing direction of the driver is derived from said parameters.

The viewing direction of the driver is preferably defined by a starting point, such as a head center point of the driver or a point between the two eyes of the driver, such as in the region of the nasal root, and by a vector. The starting point and the vector can be indicated in a coordinate system, such as a coordinate system of the vehicle. In particular, the viewing direction can be understood to be a ray having a defined direction and a defined starting point. The viewing direction of the driver can provide a first rough estimate of the driver's field of view.

The determination of the driver's field of view is defined with further precision in a sub-step S1a of the capturing step S1, by virtue of a solid angle aligned with the viewing direction being ascertained on the basis of the parameters. The solid angle can also be understood to be a cone of vision, wherein objects located within the solid angle can be visually perceived by the driver. The solid angle, or cone of vision, is preferably ascertained such that the origin thereof is located in the starting point of the viewing direction.

The opening of the solid angle, that is to say an angle region around the viewing direction, is for example ascertained on the basis of the parameters.

In order to be able to mathematically assess the position of object points, which indicate the position of an object with respect to which the attention of the driver is to be evaluated, in relation to the solid angle, preferably a virtual cross-sectional area through the solid angle is defined on the basis of the ascertained solid angle in a second sub-step S1b of the capturing step S1. The virtual cross-sectional area is here preferably perpendicular to the viewing direction and has a finite extent in a horizontal direction, that is to say along a transverse axis of the vehicle, and in a vertical direction, that is to say along a vertical axis of the vehicle.

The horizontal and vertical delimitation can here depend on the distance of the virtual cross-sectional area from the driver, in particular from the starting point of the viewing direction of the driver, for example from his head center point. If the virtual cross-sectional area is defined for example at a short distance from the driver, the virtual cross-sectional area only has a small size. If the virtual cross-sectional area, by contrast, is defined at a greater distance from the driver, the virtual cross-sectional area has a larger size.

The size of the virtual cross-sectional area, in particular the spatial delimitation of the virtual cross-sectional area, here preferably indicates a measure of the size of the driver's field of view.

The determination of the virtual cross-sectional area, in particular the spatial delimitation thereof, depends on the parameters which have been captured by sensor means over the solid angle region. The parameters included in the ascertainment of the solid angle or the definition of the virtual cross-sectional area are also referred to as parameters that influence the driver's field of view.

From these parameters that influence the driver's field of view, for example the anatomy and/or the seating position of the driver, a delimitation of the field of view is derived, in particular a horizontal and/or vertical delimitation of the virtual cross-sectional area. Alternatively or additionally thereto, the distance of the virtual cross-sectional area from the driver is also determined on the basis of the parameters that influence the driver's field of view.

A parameter that influences the driver's field of view can relate to the arrangement of objects, in particular relative to the driver's head, in the interior of the vehicle that impair the driver's view out of the vehicle.

Examples of such objects are A, B and/or C pillars, the rear-view mirror, the dashboard or parts thereof and/or the like. In particular, the dashboard or parts thereof form a horizon below which the driver cannot visually perceive objects that are located outside the vehicle.

A further parameter that influences the driver's field of view can relate to a visual acuity of the driver, in particular if the field of view is horizontally or vertically limited on account of a vision aid or if an anatomical eye position impairs the field of view.

Another parameter that influences the driver's field of view can also be given by external situations, that is to say situations in which the field of view is influenced for psychological reasons. At high speeds of the vehicle, for example tunnel vision, as it is called, can occur in the driver which causes the driver's field of view to decrease. At greater speeds, the virtual cross-sectional area can therefore be defined closer to the driver's head.

In an object capturing step S2, object points of objects that are to be evaluated with respect to the attention of the driver are captured. The object points here define a position of the respective objects relative to the vehicle and/or to the driver, in particular to the driver's head. The object points can for example be points in a coordinate system of the vehicle.

The object points of objects that are outside the vehicle, such as other road users, are ascertained by sensor-based capturing of the objects that are outside the vehicle, for example using cameras, radar sensors, lidar sensors, ultrasonic sensors and/or the like.

The object points of objects that are inside the vehicle, such as components of the vehicle interior such as steering wheel, vehicle state displays and/or operating elements of vehicle functionalities, are preferably held in a database and read in the object capturing step S2.

In an imaging step S3, the position of the captured object points with respect to the solid angle is ascertained. To this end, the object points can be projected onto the virtual cross-sectional area, where the distance of the projection of the object points from the spatial delimitation of the cross-sectional area and/or from a center of the cross-sectional area, for example a point of intersection of the cross-sectional area and the viewing direction, is ascertained. The center of the cross-sectional area can in particular be the centroid of the solid angle.

The object points are preferably projected onto the cross-sectional area using imaging matrices that effect perspective imaging of the object points when applied to the object points. It may be necessary here to transform the object points from one coordinate system, such as the coordinate system of the vehicle, to a different coordinate system, such as a coordinate system of the driver's head or of the virtual cross-sectional area. Different object points, for example object points of objects that are located outside the vehicle and object points of objects that are located inside the vehicle must here possibly be transformed differently, for example from an external coordinate system of the vehicle surroundings or from an internal coordinate system of the vehicle interior.

In an evaluation step S4, the ascertained position of the captured object points with respect to the solid angle, in particular the ascertained position on the virtual cross-sectional area, is evaluated. Object points which are located outside the solid angle or the projection thereof outside the spatial delimitation of the cross-sectional area are located outside the driver's field of view and can therefore not be visually perceived by the driver. Said object points are evaluated as not having been noticed.

Object points which are located within the solid angle or the projection thereof within the spatial delimitation of the cross-sectional area, are evaluated as being located within the driver's field of view and therefore as having been at least potentially noticed. These object points can at least potentially be visually perceived by the driver.

The evaluation of the attention of the driver with respect to an object point can be effected in dependence on the distance of the projection of the object point from a center of the solid angle or the virtual cross-sectional area, for example in dependence on the distance from the viewing direction. Object points whose projections lie near the center are perceived by the driver with a greater probability than object points whose projections lie in a peripheral region of the virtual cross-sectional area, that is to say in the vicinity of the spatial delimitation of the virtual cross-sectional area, and therefore have a greater distance from the center.

It is also possible here to evaluate lines and/or areas that are defined by a plurality of object points with respect to the attention of the driver. To this end, an intersection length or area of the lines and/or areas that are defined by the plurality of object points with the virtual cross-sectional area is ascertained. The probability with which the driver perceives the lines or areas defined by the plurality of object points can then be ascertained in dependence on the size of the intersection length or area.

Figure 2:
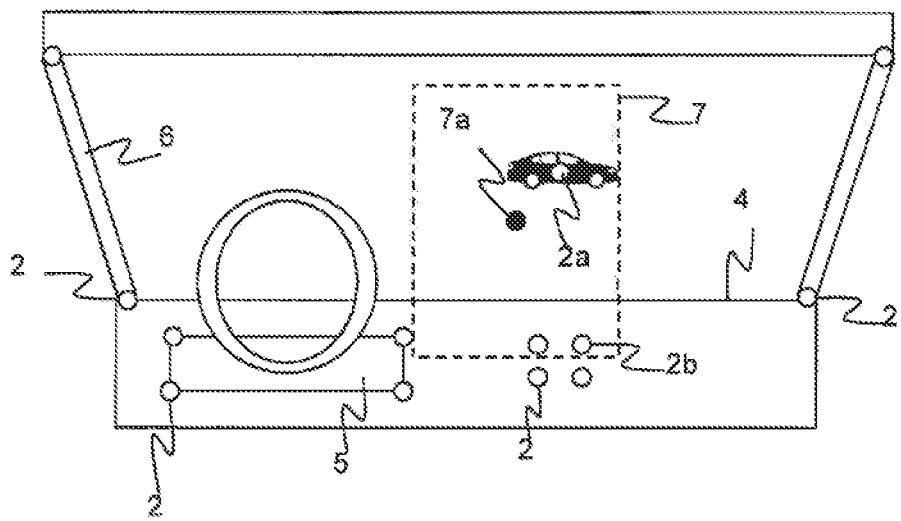
FIG. 2 shows an example of object points.

FIG. 2 shows an example of object points 2 in a cockpit of a vehicle which define the position of objects in a coordinate system, such as the coordinate system of a vehicle.

The object points 2 can be divided into two groups: object points 2 which are provided by objects in or on the vehicle itself and will be referred to below also as object points that are inside the vehicle, and object points 2 which are provided by objects that are located outside the vehicle and will also be referred to below as object points that are outside the vehicle.

Object points 2 that are provided by objects in or on the vehicle itself can define positions of operating elements 3 of the vehicle, such as on a dashboard 4 of the vehicle or structural components 6 of the vehicle, such as an A pillar of the vehicle. It is also possible for a plurality of object points 2 to define areas 5 in which for example information concerning the vehicle state is displayed to the driver.

Object points that are inside the vehicle are preferably formed by nodes of a wire-grid model of the vehicle, in particular of the vehicle interior. The wire-grid model can reproduce the contour of the vehicle interior, wherein individual object points 2 corresponding to operating elements are arranged on the contour.

Object points that are outside the vehicle are ascertained by sensor-based capturing of the vehicle surroundings, such as by monitoring the vehicle surroundings using one or more cameras, radar sensors, laser sensors, ultrasound sensors and/or the like.

It is possible using an ascertained viewing direction and a solid angle based thereon or a virtual cross-sectional area 7 through the solid angle that has been ascertained based on the solid angle to evaluate whether a specific object point 2 is located in the driver's field of view and, in particular, with what probability it will be perceived by the driver.

In this case, the position of the object points 2 relative to the virtual cross-sectional area 7, in particular to a center 7a of the virtual cross-sectional area 7, which is defined for example by the point of intersection of the virtual cross-sectional area 7 and the viewing direction of the driver, is preferably evaluated.

In the example shown, the object point 2a which is outside the vehicle and indicates the position of a further vehicle in the coordinate system of the vehicle is located closer to the center 7a of the virtual cross-sectional area 7 than an object point 2b that is inside the vehicle and indicates the position of an operating element of the vehicle in the coordinate system of the vehicle. Accordingly, the driver will perceive the further vehicle with a greater probability than the operating element.

Figure 3:
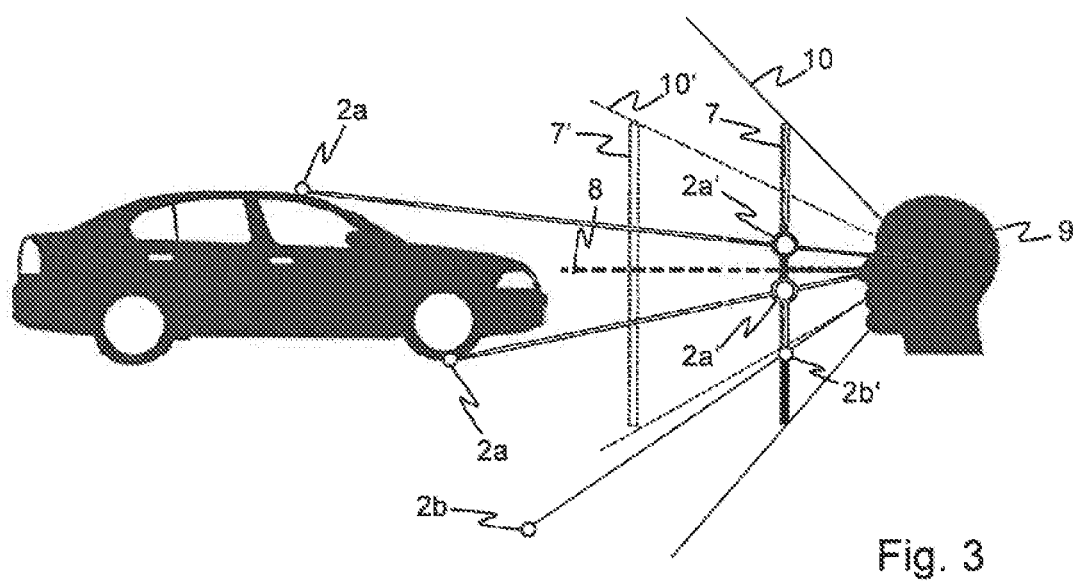
FIG. 3 shows an example of a virtual cross-sectional area.

FIG. 3 shows an example of a virtual cross-sectional area 7 which has been ascertained on the basis of a viewing direction 8 of a driver 9 of a vehicle and of a solid angle 10 that has been ascertained based on the viewing direction 8. The virtual cross-sectional area 7 can here be interpreted to be the field of view of the driver 9.

In order to ascertain an evaluation of the attention with respect to an object the position of which is given by object points 2a, the object points 2a of the object are projected onto the virtual cross-sectional area 7. The position of the projected object points 2a' with respect to the virtual cross-sectional area 7, in particular on the virtual cross-sectional area 7, gives the probability with which the object is perceived by the driver 9.

The object, the projected object points 2a' of which are located in the region of a center 7a of the virtual cross-sectional area 7, in particular in the vicinity of the point of intersection of the virtual cross-sectional area 7 and the viewing direction 8, is here perceived with a greater probability than an object having a corresponding object point 2b, the projected object point 2b' of which is located within the region of the periphery of the virtual cross-sectional area 7, in particular in the region of the spatial delimitation formed by the solid angle 10 of the virtual cross-sectional area 7.

The viewing direction 8, the solid angle 10 and/or the virtual cross-sectional area 7 is ascertained by sensor-based capturing or on the basis of at least one parameter that has been captured by way of sensor means and influences the field of view of the driver 9. The at least one parameter that influences the field of view of the driver 9 can here define the size of the solid angle 10 or the spatial delimitation of the virtual viewing area 7.

If the vehicle for example drives at increased speed, the field of view of the driver 9 becomes restricted. Colloquially, this is referred to as tunnel vision. In the example shown, this is indicated by a further virtual cross-sectional area 7', the distance d' of which from the head of the driver 9 is greater than the distance d of the virtual cross-sectional area 7 from the head of the driver 9. The further virtual cross-sectional area 7', which can be considered to be the field of view of the driver 9 at increased speed, is spatially delimited by the smaller solid angle 10'. As a result, the driver 9 no longer perceives the object with the object point 2b at the increased speed.

LIST OF REFERENCE SIGNS 1 method for driver state evaluation
2, 2a, 2b object points
2a', 2b' projected object points
3 operating elements
4 dashboard
5 area
6 components of the vehicle interior
7, 7' virtual cross-sectional area
7a center of the virtual cross-sectional area
8 viewing direction
9 driver
10 solid angle
S1-S4 method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for driver state evaluation with respect to a driver of a vehicle, the method comprising:
   capturing, using a camera disposed in the vehicle, a viewing direction of the driver into a field of view that is defined relative to the vehicle;
   ascertaining a solid angle aligned with the viewing direction captured by the camera in dependence on at least one parameter that influences the field of view;
   defining a virtual cross-sectional area through the ascertained solid angle, wherein
      the virtual cross-sectional area is delimited by a plane oriented substantially perpendicular to the captured viewing direction and intersecting with the ascertained solid angle;
   deriving a delimitation of the virtual cross-sectional area based on the at least one parameter, wherein
      the at least one parameter characterizes a seating position and/or an anatomical property of the driver and is ascertained by a first sensor or is provided via an interface;
   deriving at least one object point of a three-dimensional environment of the driver based on:
      detecting an exterior object using a second sensor disposed on the vehicle; and/or
      reading a three-dimensional model of an interior vehicle object from a memory;
   evaluating the at least one object point of a three-dimensional environment of the driver based on a position of the driver with respect to the ascertained solid angle and with respect to the defined virtual cross-sectional area; and
   determining and outputting an attention-related driver state in dependence on said evaluation to control one or more driver-assistance systems of the vehicle.

2. The method according to claim 1, wherein the solid angle is ascertained in the capturing such that the viewing direction extends through the center of the solid angle.

3. The method according to claim 1, wherein the at least one parameter is ascertained dynamically in dependence on a vehicle state.

4. The method according to claim 3, further comprising:
   expanding or contracting the solid angle based on the at least one parameter, wherein the at least one parameter characterizes a speed of the vehicle.

5. The method according to claim 1, wherein the at least one parameter is defined by interior components of the vehicle.

6. The method according to claim 1, wherein one or more objects located outside the vehicle are captured by the second sensor and each of the captured objects located outside the vehicle define at least one object point of the three-dimensional environment of the driver.

7. The method according to claim 1, wherein a functionality of the vehicle is controlled based on the attention-related driver state that is output.

8. The method according to claim 1, wherein the second sensor comprises one or more of:
a second camera;
a radar sensor;
a lidar sensor; or
an ultrasonic sensor.

9. The method according to claim 1, wherein the at least one object point is evaluated as not having been noticed by the driver if the at least one object point, when projected onto the virtual cross-sectional area, is located behind one or more second object points.

10. The method according to claim 9, wherein the one or more second object points correspond to an interior vehicle object as defined by the three-dimensional model of the interior vehicle object.

11. The method according to claim 1, further comprising:
projecting the at least one object point onto the virtual cross-sectional area;
projecting a second object point onto the virtual cross-sectional area; and
evaluating the at least one object point as having been noticed by the driver with greater probability than the second object point based on the at least one object point being located closer to a center of the virtual cross-sectional area than the second object point.

12. A method for driver state evaluation with respect to a driver of a vehicle, the method comprising:
capturing, using a camera disposed in the vehicle, a viewing direction of the driver into a field of view that is defined relative to the vehicle;
ascertaining a solid angle aligned with the viewing direction captured by the camera in dependence on at least one parameter that influences the field of view;
defining a virtual cross-sectional area through the ascertained solid angle, wherein
the virtual cross-sectional area is delimited by a plane oriented substantially perpendicular to the captured viewing direction and intersecting with the ascertained solid angle;
deriving at least one object point of a three-dimensional environment of the driver based on:
detecting an exterior object using a sensor disposed on the vehicle; and/or
reading a three-dimensional model of an interior vehicle object from a memory;
evaluating the at least one object point of a three-dimensional environment of the driver based on a position of the driver with respect to the ascertained solid angle and with respect to the defined virtual cross-sectional area; and
determining and outputting an attention-related driver state in dependence on said evaluation to control one or more driver-assistance systems of the vehicle, wherein
a lateral delimitation of said virtual cross-sectional area is defined in dependence on a distance thereof from the driver based on the ascertained solid angle; and
the evaluation of the at least one object point based on the position thereof with respect to the ascertained solid angle is performed based on a mathematical projection of the object point onto the virtual cross-sectional area.

13. The method according to claim 12, wherein the at least one object point is evaluated as not having been noticed by the driver if the at least one object point, when projected onto the virtual cross-sectional area, does not lie within the lateral delimitation of the virtual cross-sectional area.

14. The method according to claim 13, wherein the at least one object point is evaluated as having been noticed by the driver if the at least one object point, when projected onto the virtual cross-sectional area, lies within the lateral delimitation of the virtual cross-sectional area.

15. The method according to claim 14, wherein the evaluation of the at least one object point characterizes a probability with which the driver notices the at least one object point.

16. An apparatus for ascertaining an attention-related driver state of a driver of a vehicle, the apparatus comprising:
a camera disposed in the vehicle;
a memory storing a three-dimensional model of an interior vehicle object;
a sensor disposed on the vehicle and configured to detect exterior objects;
one or more processors that execute a program to:
capture, using the camera, a viewing direction of the driver into a field of view that is defined relative to the vehicle;
ascertain a solid angle aligned with the viewing direction captured by the camera in dependence on at least one parameter that influences the field of view, wherein
the at least one parameter is a speed of the vehicle ascertained dynamically in dependence on a vehicle state;
define a virtual cross-sectional area through the ascertained solid angle, wherein
the virtual cross-sectional area is delimited by a plane oriented substantially perpendicular to the captured viewing direction and intersecting with the ascertained solid angle;
expand or contract the solid angle based on the at least one parameter;
derive at least one object point of a three-dimensional environment of the driver based on:
detecting an exterior object using the sensor disposed on the vehicle; and/or
reading the three-dimensional model of the interior vehicle object from a memory;
evaluate the least one object point of a three-dimensional environment of the driver based on a position of the driver with respect to the ascertained solid angle and determine and with respect to the defined virtual cross-sectional area; and
output an attention-related driver state in dependence on the evaluation to control one or more driver-assistance systems of the vehicle.

17. A vehicle comprising the apparatus according to claim 16.

18. The vehicle according to claim 17, wherein the vehicle is a motor vehicle.

19. The apparatus according to claim 16, wherein the sensor comprises one or more of:
a second camera;

a radar sensor;
a lidar sensor; or
an ultrasonic sensor.

\* \* \* \* \*